(12) United States Patent
Presley-Mays (10) Patent No.: US 6,520,513 B2
(45) Date of Patent: Feb. 18, 2003

(54) GARDEN CART

(76) Inventor: Martha Presley-Mays, Homestead Station 1610 - S. El Dorado St., Stockton, CA (US) 95206

( * ) Notice: Subject to any disclaimer, the term of this patent is extended or adjusted under 35 U.S.C. 154(b) by 0 days.

(21) Appl. No.: 09/897,271

(22) Filed: Jul. 3, 2001

(65) Prior Publication Data

US 2003/0006571 A1 Jan. 9, 2003

(51) Int. Cl.$^7$ .............................. B62B 3/02; B62B 3/10; B62B 11/00
(52) U.S. Cl. .............. 280/32.5; 280/47.19; 280/47.371; 280/47.24; 280/47.35; 280/79.2; 280/79.11; 280/659
(58) Field of Search ........................... 280/47.34, 47.35, 280/47.371, 79.11, 79.2, 47.19, 47.24, 32.5, 653, 655.1, 659; 220/783, 797, 253, 500

(56) References Cited

U.S. PATENT DOCUMENTS

| | | | | |
|---|---|---|---|---|
| 5,318,315 A | * | 6/1994 | White et al. ............. | 280/47.18 |
| 5,474,483 A | * | 12/1995 | Sun ........................ | 280/33.998 |
| D365,905 S | * | 1/1996 | Yemini ........................ | D34/19 |
| 5,833,250 A | * | 11/1998 | Schier et al. ............. | 280/47.19 |
| 5,876,047 A | * | 3/1999 | Dennis ..................... | 280/47.35 |
| 6,079,720 A | * | 6/2000 | Spear et al. ........... | 280/33.998 |
| 6,176,559 B1 | * | 1/2001 | Tiramani et al. ......... | 280/47.19 |
| 6,260,865 B1 | * | 7/2001 | Yacobi et al. .......... | 248/346.01 |
| 6,264,216 B1 | * | 7/2001 | Wilson ........................ | 280/30 |

\* cited by examiner

*Primary Examiner*—Brian L. Johnson
*Assistant Examiner*—Brian L Swenson (57) ABSTRACT

Garden cart with a hollow cart housing comprised of a lower half and an upper half, the top half and bottom half removably joined by a channel located around the perimeter of the lower half, the lower half having a plurality of wheels attached for the purpose of rolling, a rotatable pull handle attached to the front lower surface of the lower cart half, a removable, replaceable tool box that inserts into the top cart half, a hinged and padded seat located on the upper front of said top cart half, a lower tool handle holding receptacle portion located on the lower rear portion of said lower cart half, a plurality of spring biased holding fingers for holding tools located on the rear and side surface of said upper cart half, and said top half capable of being easily removed from said bottom half so that said bottom cart half can be used as a conventional wheel barrow.

2 Claims, 9 Drawing Sheets

GARDEN CART

BACKGROUND OF THE INVENTION

This invention relates generally to the field of Wheeled carts, and more particularly to a garden cart.

Garden carts of various designs are available in the market today. They allow a gardener to store and transport garden tools and associated items around the garden. Some garden carts are low profile so that the user can sit on the top of the cart while gardening.

Although various garden carts are available, they have certain drawbacks. Many existing garden carts are rather small and therefore do not allow the user to carry all his or her garden related items. Many of these small carts require the user to stand up and open a compartment every time he or she wants to replace or remove a tool.

None of the carts available today allows a user to removably store long handled garden tools in the vertical position. Additionally, many gardeners require a wheel barrow to tow dirt or flower pots around the garden. This requires the gardener to purchase a wheel barrow as well as a garden cart. Finally, existing garden carts do not provide a means for a person to be shaded from the sun while gardening.

SUMMARY OF THE INVENTION

The primary object of the invention is to provide a garden cart that allows a person to sit while gardening.

Another object of the invention is to provide a garden cart that can double as a wheel barrow.

Another object of the invention is to provide a garden cart that can removably retain long handled gardening tools in a vertical position.

A further object of the invention is to provide a garden cart that can removably retain a plurality of small garden tools on the outside surface.

Yet another object of the invention is to provide a garden cart with a removable replaceable tool box.

Still yet another object of the invention is to provide a garden cart with a hinged seat panel allowing the user to access the interior of the cart.

Another object of the invention is to provide a garden cart that includes a plurality of wheels and a pull handle so that the cart can be pulled by the user.

Another object of the invention is to provide a garden cart that can accept a sun umbrella and stand so that the user can be shaded from the sun while gardening.

Other objects and advantages of the present invention will become apparent from the following descriptions, taken in connection with the accompanying drawings, wherein, by way of illustration and example, an embodiment of the present invention is disclosed.

Garden Cart comprising: A hollow cart housing comprised of a lower half and an upper half, said top half and bottom half removably joined by a channel located around the perimeter of said lower half, said lower half having a plurality of wheels attached for the purpose of rolling, a rotatable pull handle attached to the front lower surface of said lower cart half, a removable, replaceable tool box that inserts into said top cart half, a hinged and padded seat located on the upper front of said top cart half, a lower tool handle holding receptacle portion located on the lower rear portion of said lower cart half, a plurality of spring biased holding fingers for holding tools located on the rear and side surface of said upper cart half, and said top half capable of being easily removed from said bottom half so that said bottom cart half can be used as a conventional wheel barrow. Tubular sockets located on the top surface of the cart allows the user to place an umbrella pole into a socket so that the umbrella shades the user from the sun while gardening.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
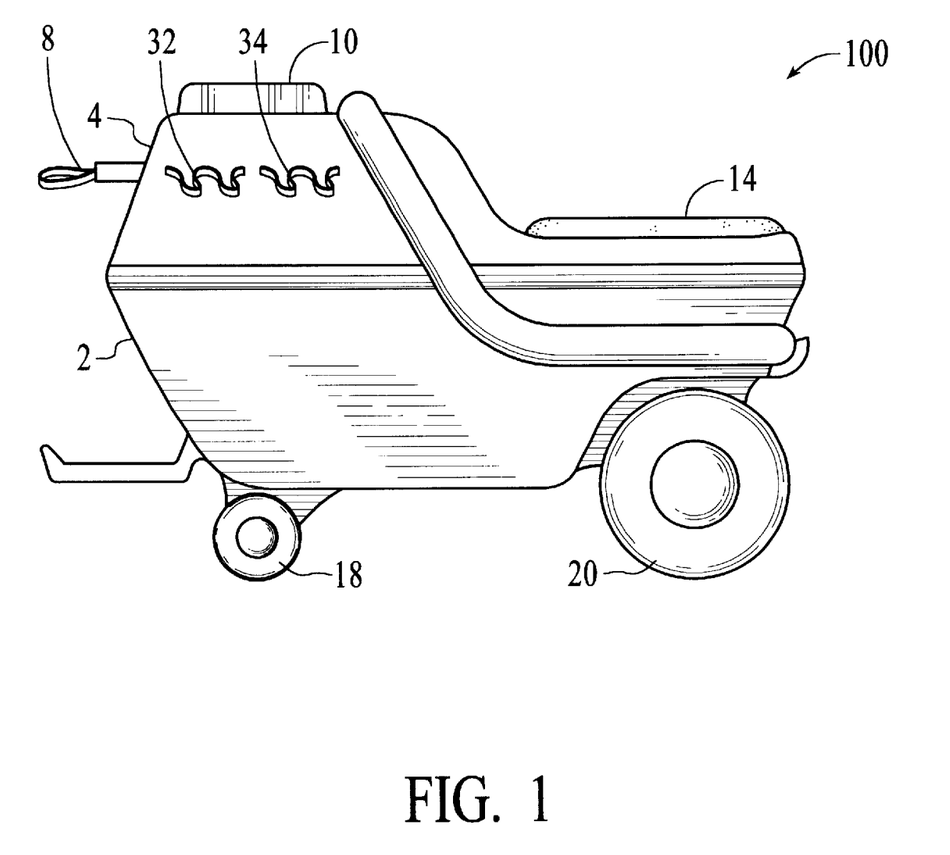
FIG. 1 is a side view of the garden cart of the present invention.
Figure 2:
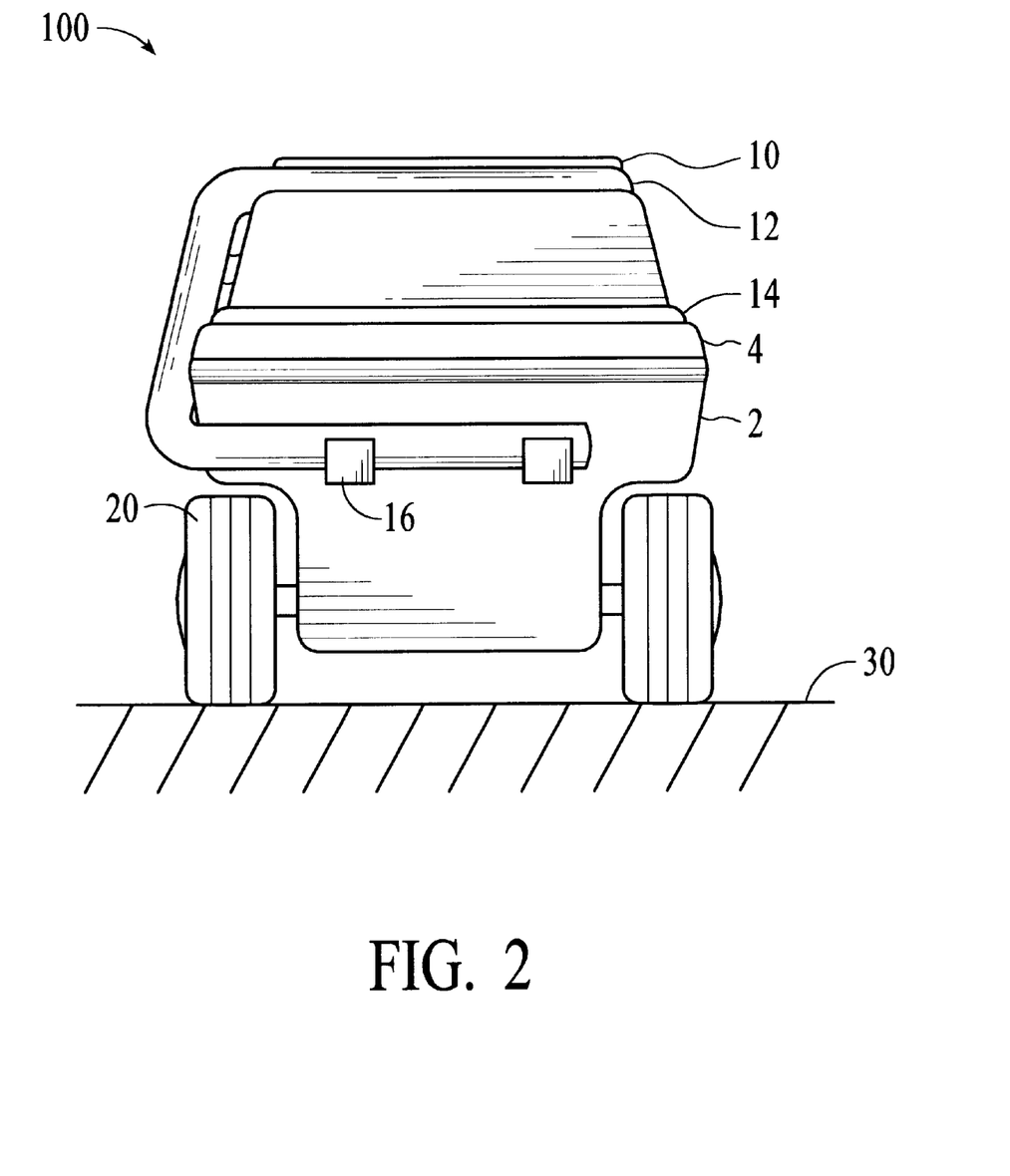
FIG. 2 is a front view of the garden cart of the present invention.
Figure 3:
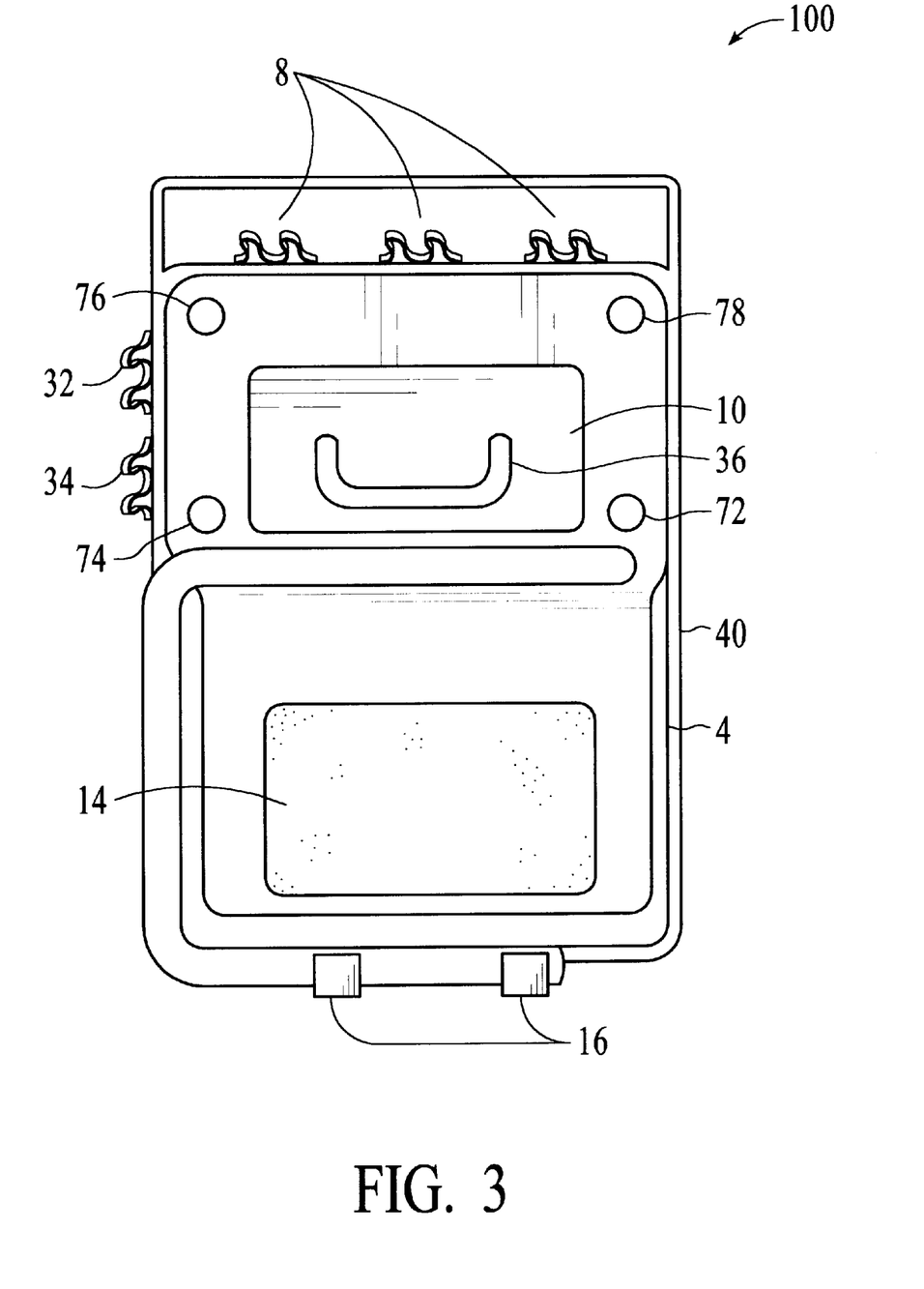
FIG. 3 is a top view of the garden cart of the present invention.
Figure 4:
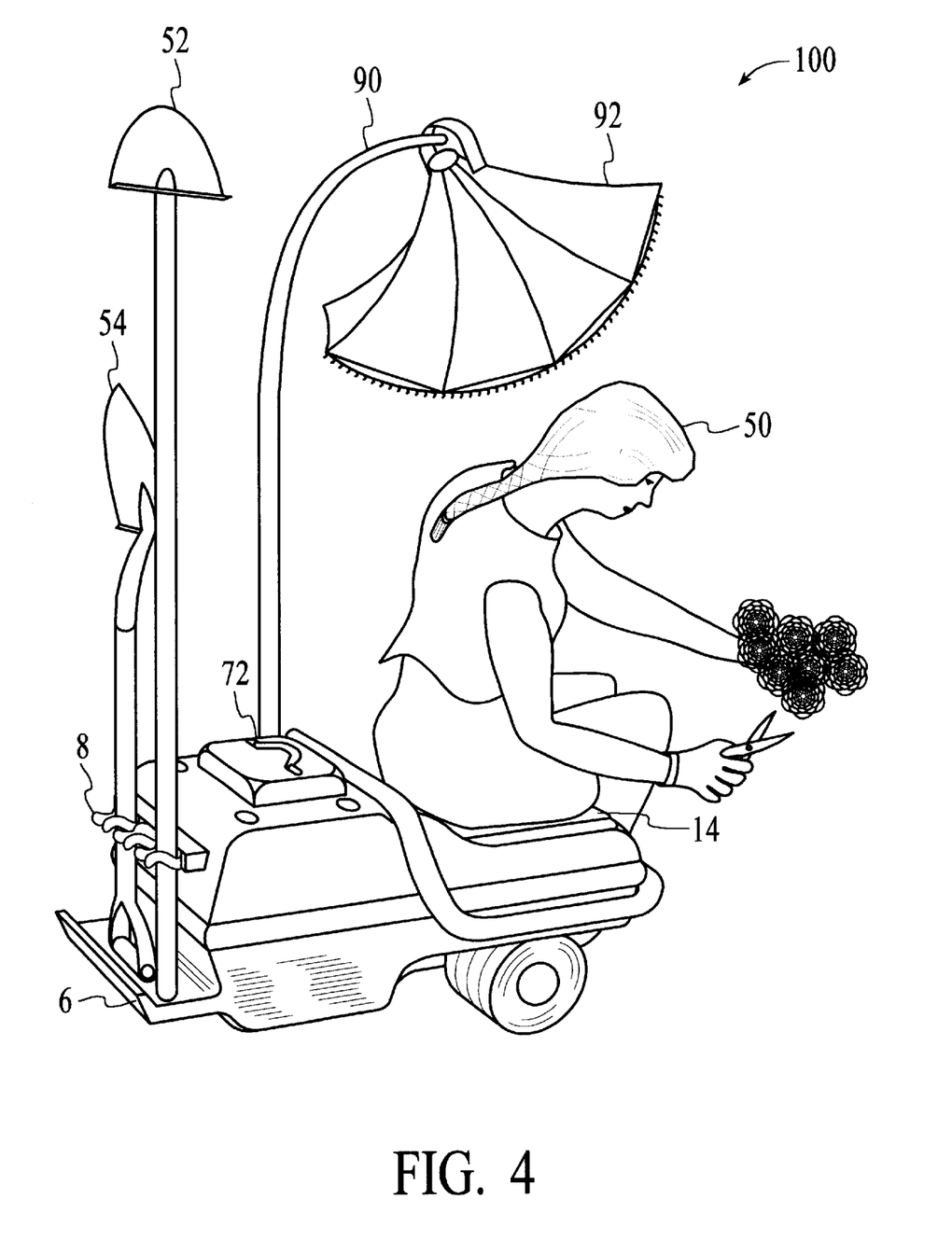
FIG. 4 is perspective view of a user sitting on the garden cart of the present invention.
Figure 5:
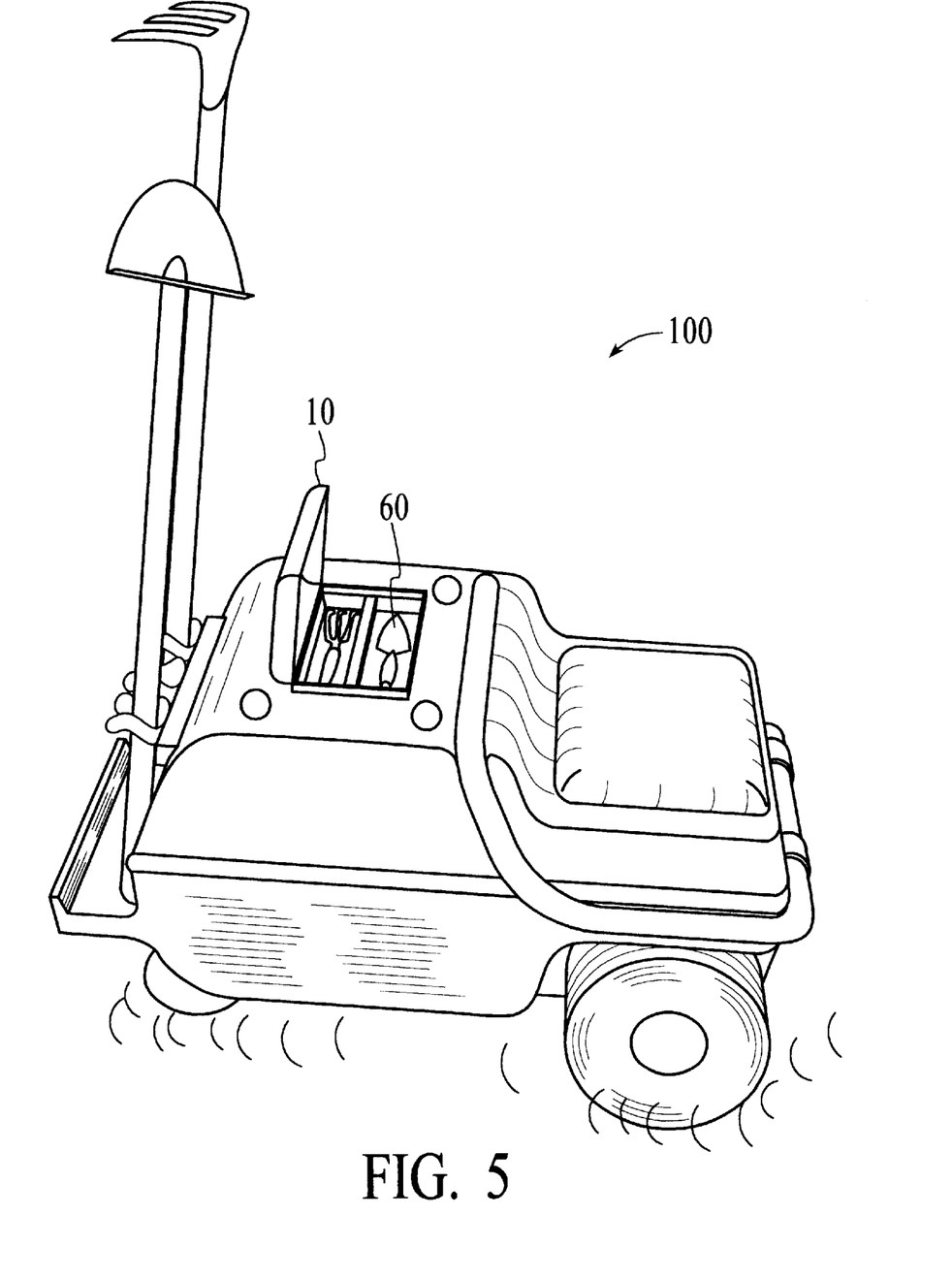
FIG. 5 a perspective view of a user opening the tool box in the top of the garden cart of the present invention.
Figure 6:
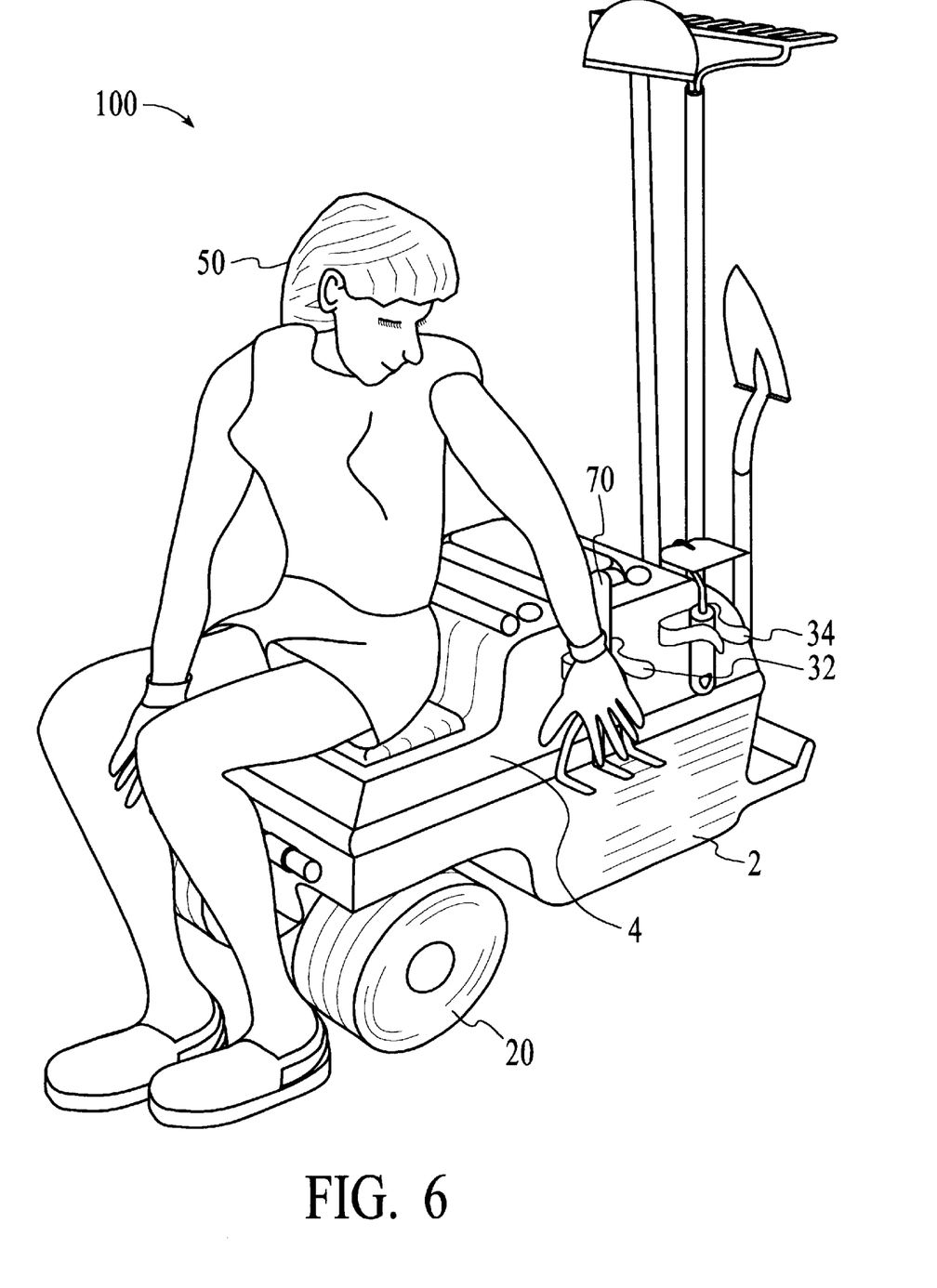
FIG. 6 is a perspective view of a user removing a hand tool from a tool holder located on the side of the upper cart half.
Figure 7:
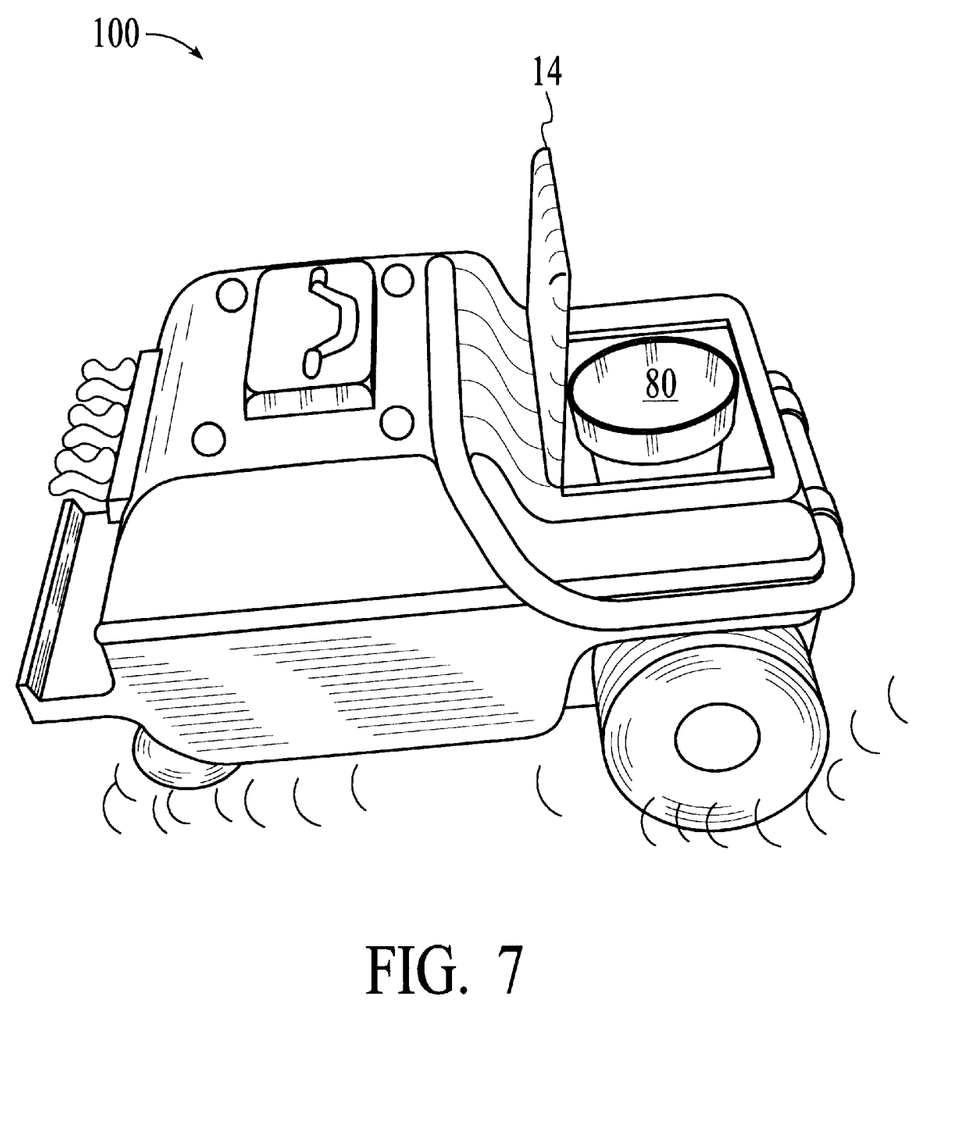
FIG. 7 is a perspective view showing a user opening the hinged seat portion to access the inside of the garden cart.
Figure 8:
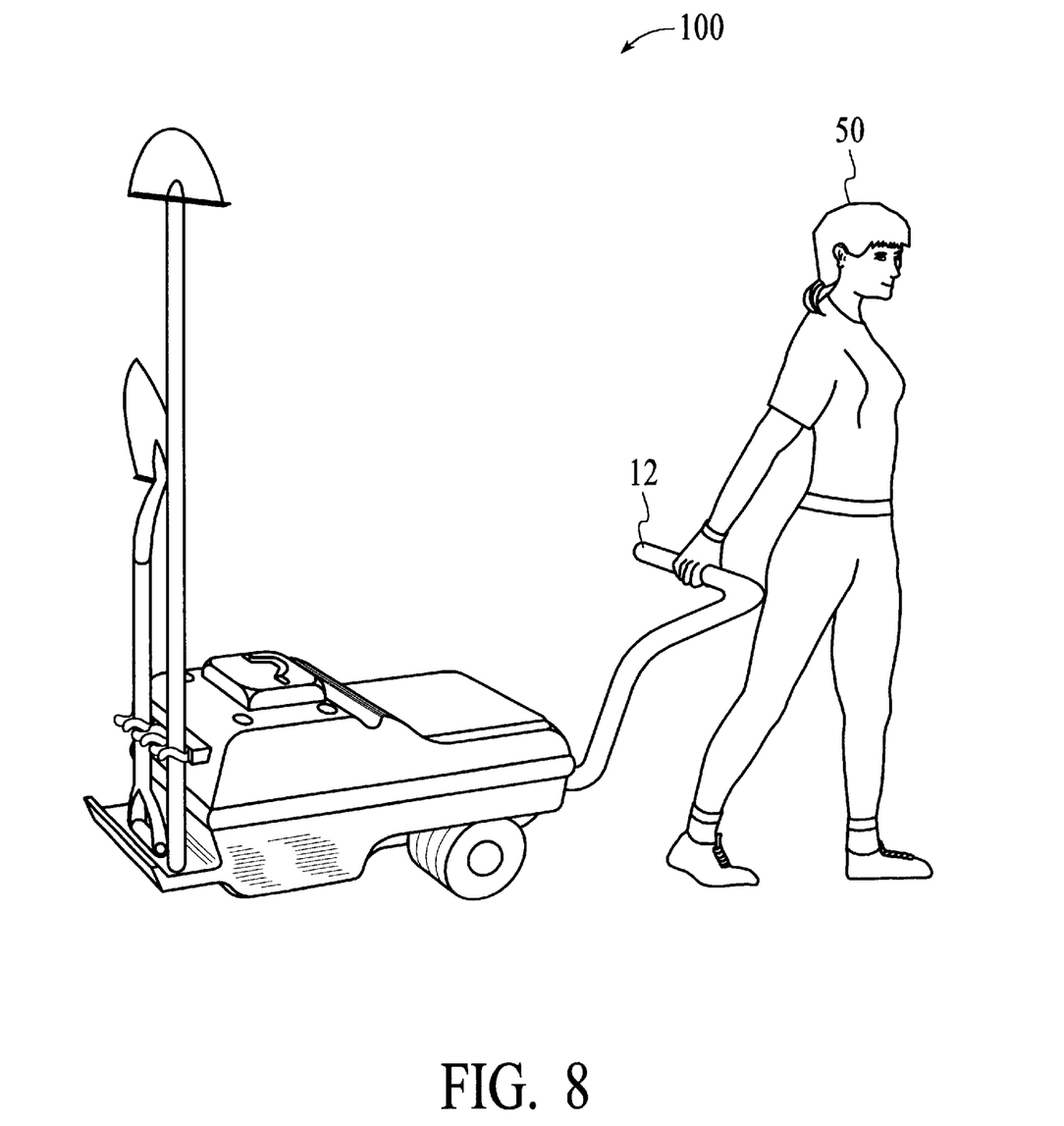
FIG. 8 is a perspective view of a person pulling the garden cart of the present invention.
Figure 9:
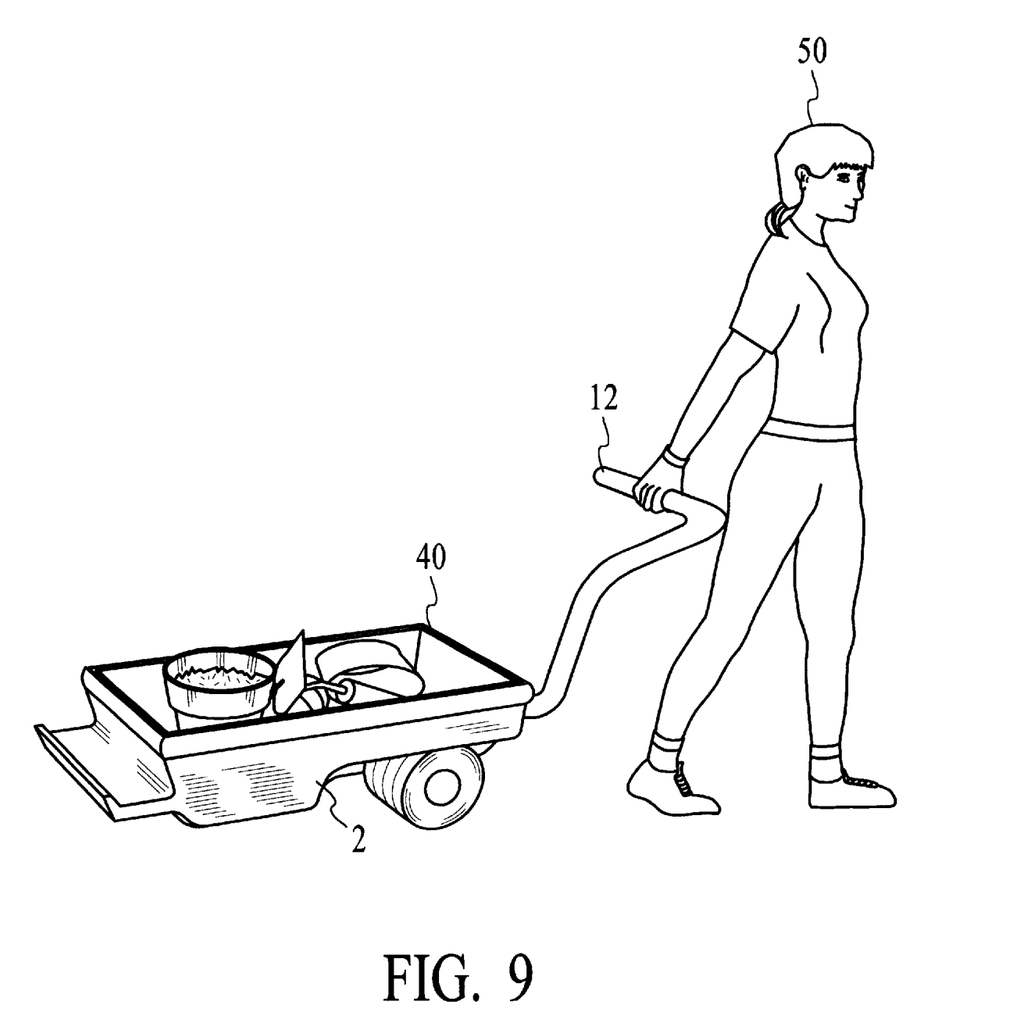
FIG. 9 is a perspective view of a person pulling the bottom, wheel barrow half of the present invention.

Referring now to FIG. 1 we see a side view of the garden cart of the present invention 100. The cart can be rolled by means of wheels 18, 20. Seat portion 14 is situated at the front portion of the upper half 4 of the garden cart 100. It's height is appropriate for comfortable for sitting while attending to flowers and the like in a typical garden. In the preferred embodiment, the seat portion 14 is padded with resilient closed cell foam material or the like. FIG. 2 shows a front view of the garden cart 100. U shaped hinge members 16 can be seen for allowing pull handle 12 to be rotated into the pull position as shown in FIG. 8 or stored as shown current FIG. 2. FIG. 3 shows a top view of the garden cart 100. Tool box 10 can be removed by handle 36. Spring biassed tool holders 8, 32, 34 can be clearly seen. The outside edge of channel 40 can be seen which helps the upper cart half 4 be removably retained by lower cart half 2. Sockets 72, 74, 76, 78 allow a user to insert the central pole 90 of an umbrella. The multiple sockets allow the user to choose where to place the umbrella pole 90 to most effectively block the sun. FIG. 4 shows a person 50 sitting on the seat 14 of the garden cart 100. Umbrella pole 90 can be seen inserted into socket 72. The umbrella portion 92 is shown deployed and thereby providing shade for the user 50. Long handled tools 52, 54 are shown in their retained position and being removably retained by lower tool handle holder 6 and upper tool holder handle 8. FIG. 5 shows a person 50 removing an item 60 from tool box 10. The entire tool box is removable and replaceable so that the user 50 can take the tool box to another location without moving the entire garden cart 100. The tool box has a removable tray so that a person can use the tool box 10 to hold larger items such as flower pots or the like. FIG. 6 is a perspective view showing a person 50 removing a small hand tool 70 from spring holder 34 located on the side of the upper cart half 4. In this way a person has easy access to small tools without changing position while sitting on the garden cart 100. FIG. 7 shows a person 50 accessing a flower pot 80 inside of the cart housing by lifting hinged seat portion 14. FIG. 8 shows a person 50 pulling the handle 12 of the garden cart 100. FIG. 9 shows the the top half 4 removed leaving the lower half 2 to act as a traditional wheel barrow Channel 40 can be clearly seen around the perimeter of the top edge of the lower cart half 2. This channel 40 allows the top cart half 4 to easily removably attach to the bottom half 2.

In the above described and illustrated way a gardener can use the cart of the present invention as either a wheel barrow or a storage device having a convenient seat portion. The cart stores items both inside the cart housing and outside by way of external tool holders. Special tool holder at the rear of the cart allows a person to removably store long handled tools in the vertical position.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Garden cart comprising:

a hollow cart housing comprised of a lower half and an upper half;

said top half and bottom half removably joined by a channel located around the perimeter of said lower half;

said lower half having a plurality of wheels attached for the purpose of rolling;

a rotatable pull handle attached to the front lower surface of said lower cart half;

a removable, replaceable tool box that inserts into said top cart half;

a hinged and padded seat located on the upper front of said top cart half;

a lower tool handle holding receptacle portion located on the lower rear portion of said lower cart half;

a plurality of spring biased holding fingers for holding tools located on the rear and side surface of said upper cart half; and said top half capable of being easily removed from said bottom half so that said bottom cart half can be used as a conventional wheel barrow.

2. A garden cart as claimed in claim 1 wherein said cart top includes a plurality of sockets, said sockets capable of removably retaining an umbrella pole, said pole terminating at one end in a standard umbrella that can protect the user from exposure to the sun.

* * * * *